(12) United States Patent
Chou et al.

(10) Patent No.: US 7,349,440 B1
(45) Date of Patent: Mar. 25, 2008

(54) SYSTEM AND METHOD FOR BROADCASTING INFORMATION OVER A NETWORK

(75) Inventors: Philip A. Chou, Bellevue, WA (US); Kamal Jain, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 10/686,952

(22) Filed: Oct. 15, 2003

(51) Int. Cl.
H04J 3/06 (2006.01)
(52) U.S. Cl. ...................................... 370/503
(58) Field of Classification Search ............. 370/229, 370/395.62, 503–520, 390
See application file for complete search history.

(56) References Cited

U.S. PATENT DOCUMENTS

| | | | |
|---|---|---|---|
| 5,631,907 A * | 5/1997 | Guarneri et al. | 370/474 |
| 5,822,317 A | 10/1998 | Shibata | |
| 6,609,223 B1 * | 8/2003 | Wolfgang | 714/752 |
| 6,940,854 B1 | 9/2005 | Acharya et al. | |
| 2003/0063569 A1 | 4/2003 | Kalliokulju et al. | |
| 2003/0156599 A1 | 8/2003 | Casaccia et al. | |
| 2003/0179698 A1 | 9/2003 | Lu | |
| 2004/0213238 A1 | 10/2004 | Peled | |
| 2004/0246905 A1 | 12/2004 | Dunagan et al. | |

OTHER PUBLICATIONS

Alswede, Cai, Li, and Yeung, "Network information flow," IEEE Trans. Information Theory, vol. 46, No. 4, pp. 1204-1216, Jul. 2000.
Li, Yeung, and Cai, "Linear Network Coding," IEEE Trans. Information Theory, vol. 49, No. 2, pp. 371-381, Feb. 2003.
Koetter and Médard, "Beyond Routing: An algebraic approach to network coding," Proc. INFOCOM, IEEE 2002, pp. 122-130.
Jaggi, Jain, and Chou, "Low Complexity Algebraic Multicast Network Codes," IEEE Int'l Symp. on Information Theory, Yokohama, Japan, Jun. 2003.
Sanders, Egner, and Tolhuizen, "Polynomial time algorithms for network information flow," ACM Symp. on Parallelism in Algorithms and Architectures, San Diego, Jun. 7-9, 2003, pp. 286-294.
Jaggi, Sanders, Chou, Effros, Egner, Jain, and Tolhuizen, "Polynomial Time Algorithms for Multicast Network Code Construction," IEEE Trans. Information Theory, Jul. 18, 2003, pp. 1-14.
Albanese, Blömer, Edmonds, Luby, and Sudan, "Priority Encoding Transmission," IEEE Trans. Information Theory, vol. 42, No. 6, pp. 1737-1744, Nov. 1996.
Davis and Danskin, "Joint Source and Channel Coding for Image Transmission Over Lossy Packet Networks," SPIE Conf. on Wavelet Applications to Digital Image Processing, vol. 2847, Denver, Aug. 1996, pp. 376-387.
Mohr, Riskin, and Ladner, "Unequal loss protection: graceful degradation of image quality over packet erasure channels through forward error correction," IEEE J. Selected Areas in Communication, vol. 18, No. 6, pp. 819-828, Jun. 2000.

(Continued)

*Primary Examiner*—Seema S. Rao
*Assistant Examiner*—Mon Cheri S Davenport
(74) *Attorney, Agent, or Firm*—Lee & Hayes, PLLC

(57) ABSTRACT

A system and method that enables broadcasting of data in packets across a network using network coding is described. This system and method enables a network to broadcast information in packets without full knowledge of the network's topology. Further, it enables broadcasting of data in packets with a low probability of failure.

21 Claims, 9 Drawing Sheets

OTHER PUBLICATIONS

Puri and Ramchandran, "Multiple description source coding using forward error correction codes," IEEE Conf. on Signals, Systems, and Computers, Asilomar, Oct. 1999. pp. 342-346.

Stockhammer and Buchner, "Progressive texture video streaming for lossy packet networks," Proc. 11th Int'l Packet Video Workshop, Kyongju, May 2001, pp. 1-12.

Leibl, Stockhammer, Wagner, Pandel, Baese, Nguyen, and Burkert, "An RTP payload format for erasure-resilient transmission of progressive multimedia streams," IETF Internet Draft draft-ietf-avt-uxp-00.txt, Feb. 2001, pp. 1-19.

Goldberg and Tarjan, "A New Approach to the Maximum-Flow Problem," Journal of the Association for Computing Machinery, vol. 35, No. 4, Oct. 1988, pp. 921-940.

Dumitrescu, Wu and Wang, "Globally Optimal Uneven Error-Protected Packetization of Scalable Code Streams," IEEE Trans. Multimedia, 2002 IEEE, pp. 73-82.

Karzanov, "Determining the Maximal Flow in a Network by the Method of Preflows," Soviet Math. Dokl., vol. 15, (1974), No. 2, 4 pages.

\* cited by examiner

PRIOR ART

PRIOR ART

Fig. 3                    PRIOR ART

PRIOR ART

US 7,349,440 B1

SYSTEM AND METHOD FOR BROADCASTING INFORMATION OVER A NETWORK

TECHNICAL FIELD

This disclosure relates to broadcasting information over networks.

BACKGROUND

Data broadcast over a network involves sending data from one sender across a network to multiple receivers. In data broadcast all of the receivers should receive substantially the same data. An example of broadcasting, though not necessarily over a network, is television broadcasting. In television broadcasting one television station (a sender) broadcasts data to multiple people with televisions (each a receiver).

There are many networks over which a sender may broadcast data to multiple receivers. One network is a physical network, such as ISPs (Internet Service Providers) on the Internet. This type of physical network includes routers, wires, and other hardware. Other networks include overlay networks on top of a physical network. Here nodes of the network include people's computers, computer servers, other logic machines, or the like.

FIG. 1 sets forth a simple model of a sender sending data across a communication network to multiple receivers. FIG. 1 shows a sender 102 sending data to a first receiver 104, a second receiver 106, and a third receiver 108. The sender 102 sends the data across a communication network 110. For purpose of clarity the sender 102 and the receivers 104, 106, and 108 are shown outside of the communication network 110. Each of these, however, may be modeled as a node within the communication network 110, as will be shown below.

The communication network 110 includes nodes. These nodes may be routers, client computers, and server computers. These nodes route, send, and/or receive data.

FIG. 2 sets forth a simple model of the communication network 110 having four intermediate nodes and nine communications paths as well as nodes representing the sender 102, the first receiver 104, and the second receiver 106.

The four intermediate nodes include a first node 202, a second node 204, a third node 206, and a fourth node 208. The sender 102 may include or be co-located with an intermediate node, though for simplicity this is not shown. Also, the receivers 104 and 106 may include or be co-located with an intermediate node, also not shown for simplicity. The communication paths (which may be physical or otherwise) are paths of communication between the sender 102, the intermediate nodes, the first receiver 104, and/or the second receiver 106. These communication paths are also referred to as "edges".

There are two typical ways in which senders broadcast data over a network. One way is called unicast. In unicasting, a sender sends data to each receiver. The problem with unicasting is that you have to dedicate a different path (with all the applicable resources) to every receiver. Because of this, unicasting may require as many resources as one sender sending to one receiver, multiplied by the number of receivers. Thus, it uses a great deal of bandwidth, making it an expensive way to send data to multiple receivers.

The second, and better, way to broadcast data over networks is called multicast. Multicasting is a more common way to broadcast data. In multicasting, a distribution tree is set up to transmit data through a network from a source (the root of the tree) to receivers (at leaves of the tree). Each node in the distribution tree simply copies data from its inbound link to one or more outbound links. Multicast results in a single path of data from the source of each receiver.

One problem with multicasting, however, is that it has a limited throughput to each receiver, as shown in FIG. 3.

FIG. 3 sets forth simple models of the communication network 110, similar to that shown in FIG. 2. Here again, there is the sender 102 (marked with an "s") and the first and second receivers 104 and 106 (marked with "$r_1$" and "$r_2$"). Each edge has a particular capacity for communicating data. In this example, each edge capacity equals a "unit", for simplicity. As shown in a first-receiver-only multicast model 302 and a second-receiver-only multicast model 304, the maximum throughput to each receiver (separately) is two units. The maximum throughput to the receiver 102 is two units and the maximum throughput to the second receiver 106 is also two units—but not if the sender 102 is sending data to both of the receivers 104 and 106.

As shown in a multicast model 306, the sender 102 may broadcast one unit of throughput to the receivers 104 and 106, using a combination of a top path in the model 302 (from the sender 102 to the first receiver 104 through just the first intermediate node 202) and a top path in the model 304 (from the sender 102 to the second receiver 106 through the intermediate nodes 202, 206, and 208). It would also be possible to use a combination of the top path in the model 302 with a bottom path in the model 304 (from the sender 102 to the second receiver 106 through just the second intermediate node 204), or a bottom path in the model 302 (from the sender 102 to the first receiver 104 through the intermediate nodes 204, 206, and 208) with the bottom path in the model 304, but not the bottom path in the model 302 and the top path in the model 304. However, the sender 102 cannot broadcast two units of throughput to the receivers 104 and 106. For the sender 102 to broadcast two units of throughput to receivers 104 and 106, it would have to use both paths in both of the models 302 and 304. Thus, the edge from the third node 206 to the fourth node 208 would have to have a capacity of two units. Edges, however, have a capacity of one unit, not two. Thus, the sender 102, with this model 306, cannot broadcast two units of throughput to the receivers 104 and 106.

At best, with multicasting, the sender 102 may broadcast one unit of throughput to both of the receivers 104 and 106, and one unit of additional throughput to either the receiver 104 or receiver 106, but not both.

Thus, with multicasting it is not possible to broadcast two units of throughput to both receivers 104 and 106 simultaneously, because the maxflow (i.e., maximum-throughput) paths to each receiver collide (e.g., at the edge between intermediate nodes 206 and 208).

For more data on this failure of multicasting, see Alswede, Cai, Li, and Yeung, "Network information flow," *IEEE Trans. Information Theory*, IT-46, pp. 1204-1216, July 2000.

Recently, performing operations (called "encoding" when performed and "decoding" when reversed) at nodes of a communication network has been discussed; it is called "network coding." With network coding, more data may be received by the receivers (called additional "throughput") compared to unicasting and multicasting. In network coding, encoding may be performed at potentially any node in the network as data traverses through the network. In unicast and multicast, the data is simply forwarded or replicated; it is not encoded at the intermediate nodes in the network. Network coding is not just an operation performed to add redundancies, such as sometimes done in unicast and multicast—it actually increases throughput.

Thus, this network coding solution may increase the maximum throughput over multicasting and unicasting.

For instance, suppose $C_i$ is the capacity, i.e., the maximum throughput, available to the receiver 104, as determined by the maxflow-mincut theorem. (For more data on this theorem, see L. R. Ford, Jr., and D. R. Fulkerson, *Flows in Networks*, Princeton University Press, 1962). Thus, $C_i$=2 for each receiver in the above example. Theoretically (see Alswede et al., supra), it is possible to broadcast to all receivers simultaneously a number of units of throughput equal to the minimum of the capacities to each receiver, that is, equal to the "broadcast capacity" $C=\min C_i$, using network coding.

To increase throughput over the conventional methods, network coding encodes data at some or all of the internal nodes of a distribution tree in a communication network, as the following figure shows.

FIG. 4 sets forth a simple network-coding model 400 of the communication network 110, similar to those shown in FIGS. 2 and 3. Here again, there is the sender 102, the first and second receivers 104 and 106, and the intermediate nodes 202, 204, 206, and 208. In this figure, data a and b is broadcast to both receivers. The third node 206 of the communication network 110 encodes the received a and b by adding a and b over a finite field. (Various other linear combinations could also be used.) The third node 206 then propagates this data downstream. The receiver 104 recovers (i.e., "decodes") a and b from a and a+b by subtracting a from a+b. The receiver 106 recovers (i.e., "decodes") a and b from a+b and b, similarly by subtracting b from a+b. Thus, with network coding, the receivers 104 and 106 both may receive two units of data. Each of these pieces of data, b, a, and a+b, are referred to generically as "symbols."

Here the encoding functions performed at the internal nodes in the network as well as the decoding functions performed at the receivers may be, in general, linear functions of data over a finite field. This is sufficient, i.e., linear functions over a finite field are sufficient at the internal nodes and at the receivers for the broadcast capacity to be achieved. (For more data on this sufficiency, see Li and Yeung, "Linear network coding," *IEEE Trans. Information Theory*, IT-49, pp 371-381, February 2003). (A finite field is a number system with only a finite number of elements, with addition, subtraction, multiplication, and division well defined.)

Some in the art of network coding have discussed the possibility of providing a way to design linear encoding functions at each internal node as well as linear decoding functions at each potential receiver. (For a discussion on this, see Koetter and Médard, "An algebraic approach to network coding," *Proc. INFOCOM*, 2002). Others have, furthermore, provided polynomial time algorithms to design the linear encoding and decoding functions. (For a discussion on this, see Jaggi, Jain, and Chou, "Low complexity optimal algebraic multicast codes," *IEEE Int'l Symp. on Information Theory*, Yokohama, June 2003; Sanders, Egner, and Tolhuizen, "Polynomial time algorithms for linear information flow," *ACM Symp. on Parallelism in Algorithms and Architectures*, San Diego, June 2003; and Jaggi, Sanders, Chou, Effros, Egner, Jain, and Tolhuizen, "Polynomial time algorithms for network code construction," *IEEE Trans. Information Theory*, submitted for possible publication, 2003). They show that field size T suffices, where T is the number of receivers. (For a discussion on this, see Jaggi, Sanders, et al., supra). Others also show that linear encoding functions may be designed randomly, and that if the field size is at least $E/\delta$, where E is the number of edges and $\delta$ is any number greater than zero, then the encoding will be invertible at any given receiver with probability at least $1-\delta$. Furthermore, if the field size is at least $ET/\delta$, then the encoding will be invertible simultaneously at all receivers with probability at least $1-\delta$.

One problem with the current theoretical discussion on network coding is that it assumes global knowledge of the network's structure, or "topology." That is, the current discussion assumes that some entity knows about each node in the network and how they are connected. This discussion assumes this global knowledge of the network topology because it provides a way to address two problems: 1) computing the broadcast capacity (so that the source knows the data rate at which to send), and 2) designing the linear decoding functions (so that each decoder knows how to invert the linear encoding functions applied at the internal nodes).

The prior art discussions also usually assume that the encoding and decoding functions must somehow be distributed reliably to the interior nodes and to the receivers. Thus, each node is assumed to be known and then told what operation to perform on the data.

Reliable distribution of the encoding functions to the interior nodes, however, may be avoided if they are chosen randomly or otherwise independently. In that case, the local encoding vectors as well as the topology must be known at the receivers in order for the receivers to compute the linear decoding functions to invert the symbols into their original form (here a and b), or they must be known at some centralized location that may reliably distribute the computed decoding functions to the receivers. Another problem with not knowing a network's topology is that if it changes, or if the model of the topology is wrong, the receivers will not be able to decode all of the symbols received.

Prior attempts have been made to design encoding functions for a class of failure patterns so that capacity is not reduced below a certain amount. But then the decoders still need to know the failure pattern in order to compute and apply the proper linear decoding function. For this purpose, communicating the failure pattern to the decoders must be done reliably. This data grows with the number of failed links.

SUMMARY

The following description and figures describe a system and method for receiving incoming packets of data and metadata, synchronizing the incoming packets based on the metadata, and linearly combining the data of each of the synchronized incoming packets into an outgoing packet.

The system and method may also create multiple packets of information, each having data and metadata, the data of each of the multiple packets capable of being linearly combined with the data from others of the multiple packets, indicating, within the metadata of each of the multiple packets, a difference between the data within each of the multiple packets, and sending, across a communications network, the multiple packets of information to multiple receivers.

Also, the system and method can receive a first number of packets, each packet including data comprising a different linear combination of a second number of parts of a set of information, wherein the first number is less than the second number and the different linear combination of at least one of the packets does not include at least one of the parts of the set of information, receive instructions usable to determine the different linear combinations in each of the packets, and determine, using the instructions, some of the parts of the set of information from the data of the packets.

BRIEF DESCRIPTION OF THE DRAWINGS

The same numbers are used throughout the disclosure and figures to reference like components and features.

DETAILED DESCRIPTION

The following disclosure describes a system and method that enables broadcasting of data in packets across a network using network coding. This system and method may allow a network to broadcast information in packets without general knowledge of the network's topology. It may also enable a network to organize and synchronize packets and communicate them with a low probability of failure.

Exemplary Method for Broadcasting Information Over a Network

Figure 5:
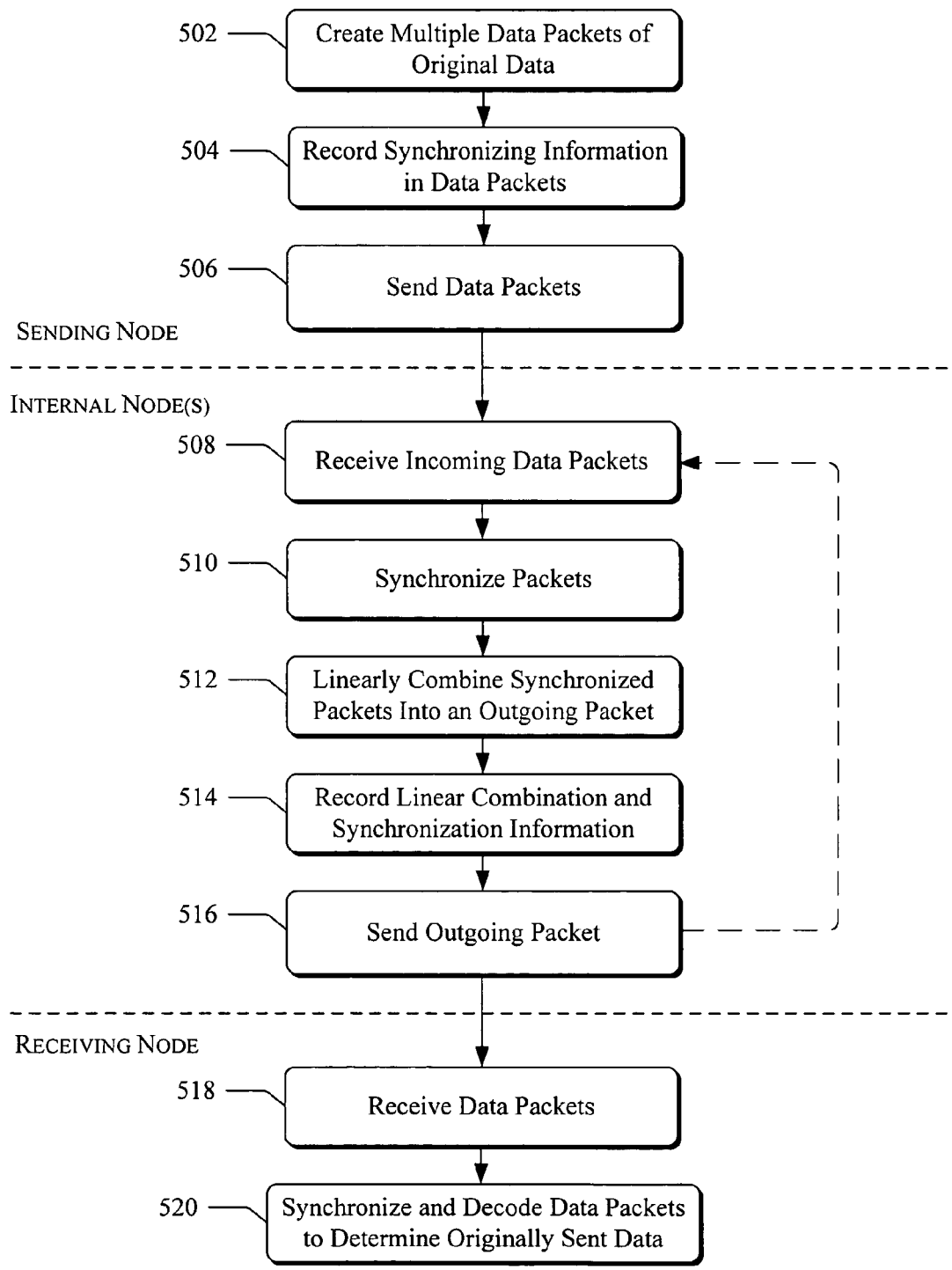
FIG. 5 is a flow diagram of an exemplary process for broadcasting data across a communication network using network coding.

FIG. 5 shows an exemplary process 500 for broadcasting information over a network. The process 500 is illustrated as a series of blocks representing individual operations or acts performed by nodes of a communication network. The process 500 may be implemented in any suitable hardware, software, firmware, or combination thereof. In the case of software and firmware, the process 500 (or blocks thereof) represents a set of operations implemented as computer-executable instructions stored in memory and executable by one or more processors.

Figure 1:
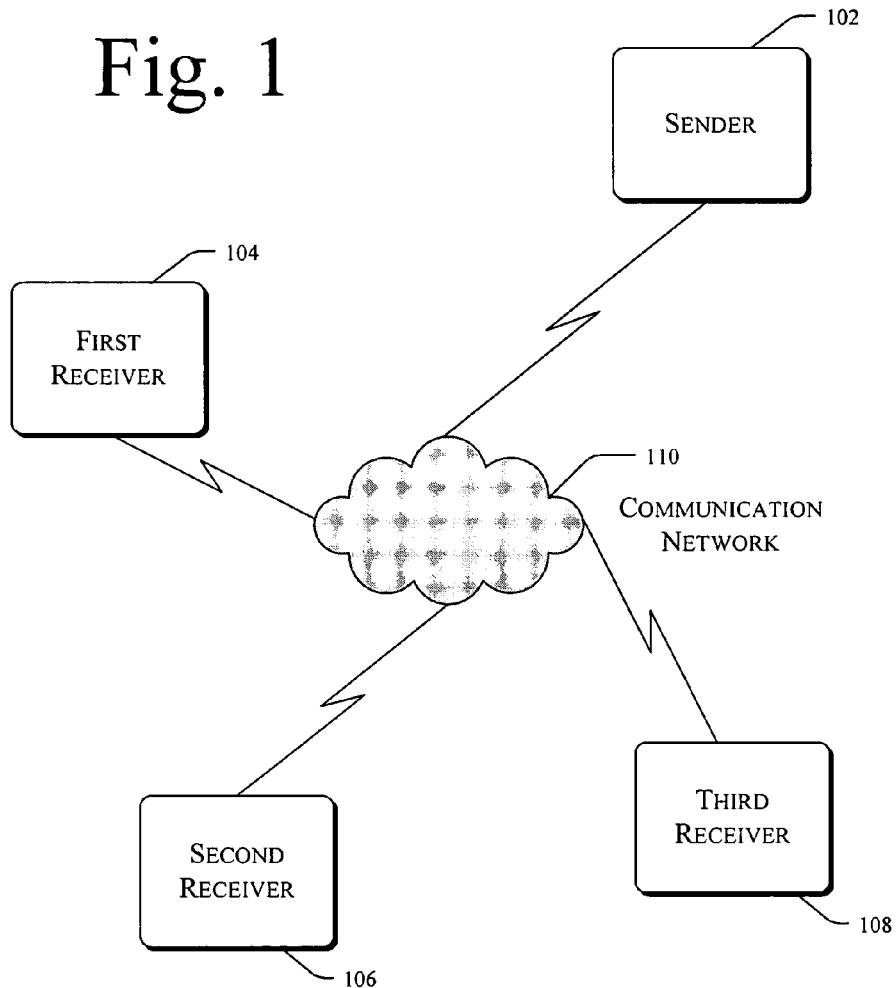
FIG. 1 illustrates a data sender, a communications network, and three data receivers.
Figure 2:
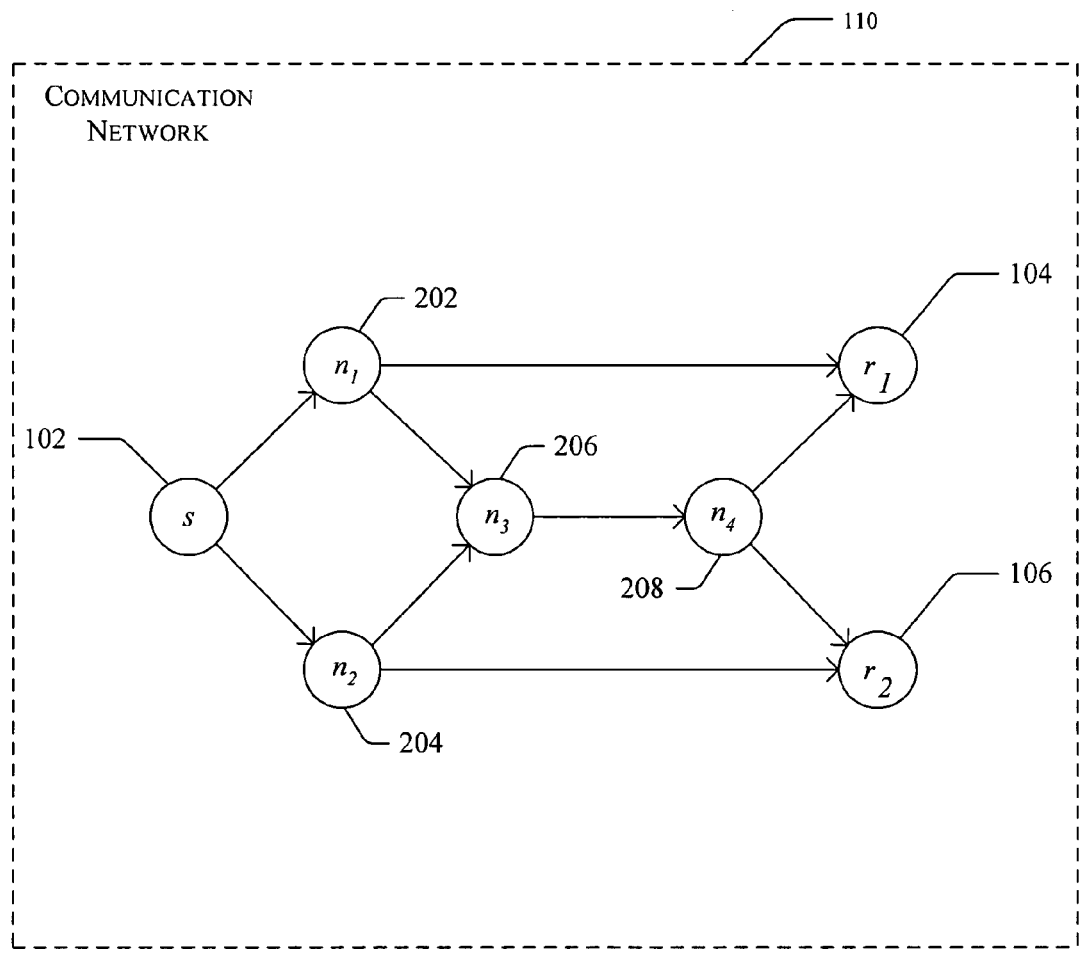
FIG. 2 illustrates a simple model of a communication network having nodes representing a sending node, intermediate nodes, and receiving nodes.
Figure 3:
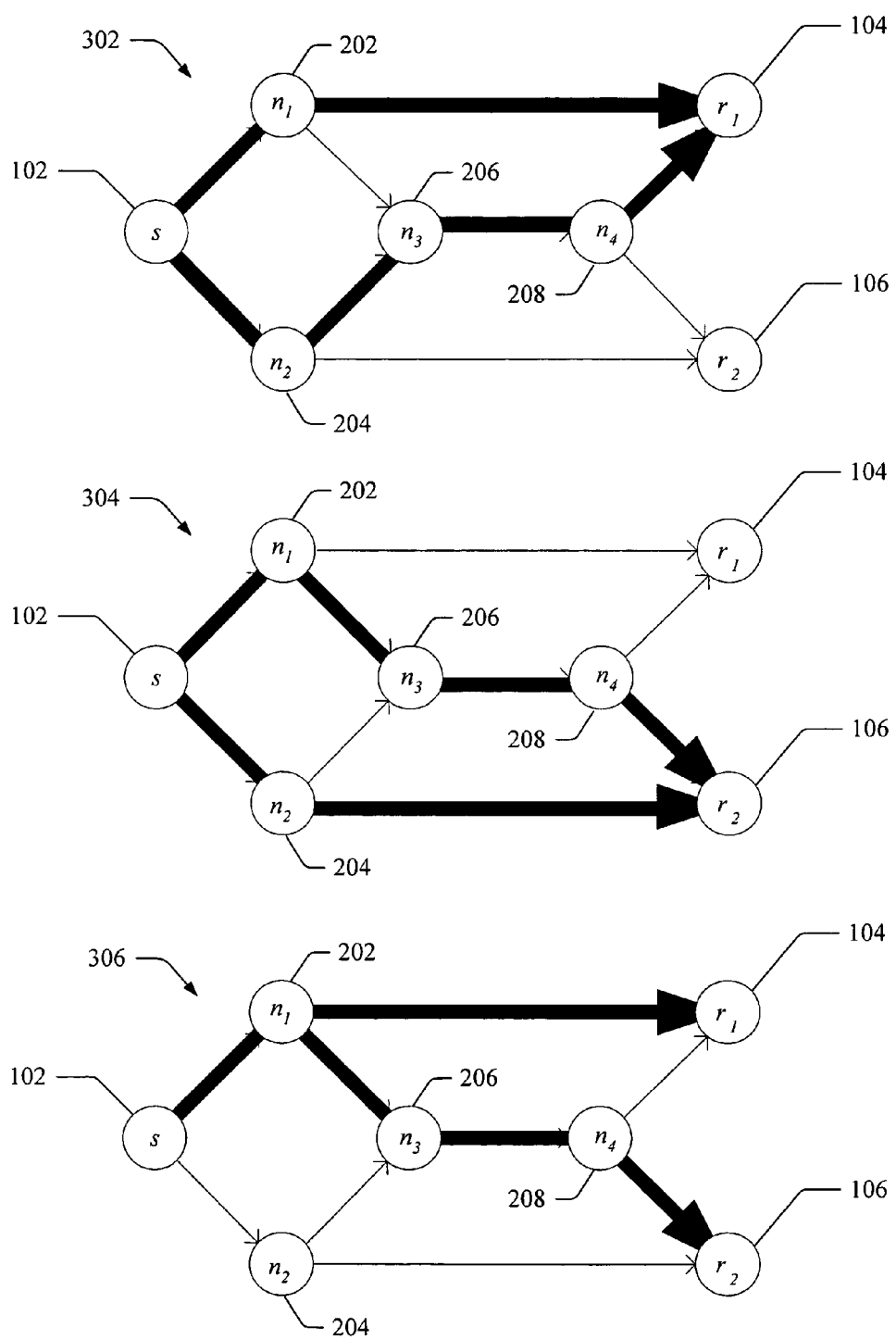
FIG. 3 illustrates simple models of a communication network each having data sent along various paths from a sending node to one or more receiving nodes.
Figure 4:
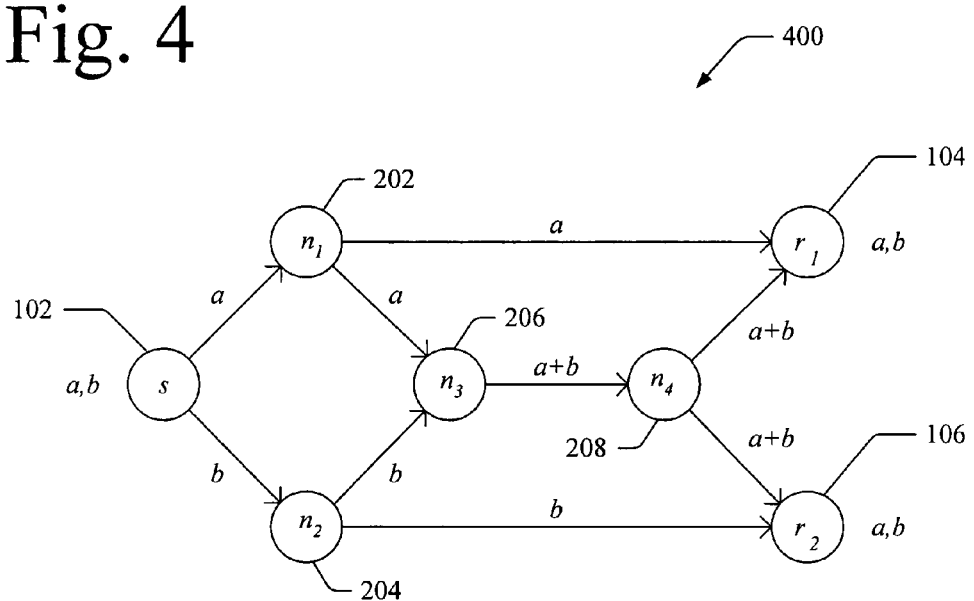
FIG. 4 illustrates a simple model of a communication network showing network coding.

For the purpose of discussion, the simple network-coding model 400 of the communication network 110 (as shown in FIG. 4), including its nodes and edges, are used to describe the process 500. This model 400 and the communication network 110 are not intended to limit the applicability of the process 500; other models and other communication networks may be used to implement the process 500 without departing from the spirit and scope of the present invention.

At block 502, the sender 102 creates multiple data packets. The sender 102 creates these data packets to contain data that the sender 102 intends to broadcast to multiple receivers, such as the receivers 104 and 106 of FIG. 4. This data originally sent by the sender 102 is the data that the sender 102 wants the receivers 104 and 106 to gain. This original data is also called a "set of data" or an "original set of data".

At block 504, the sender 102 adds metadata containing synchronization information to the multiple data packets. This synchronization information is used to maintain and infer the temporal relationships or other associations between packets of original data and packets of coded data, as discussed below. Such synchronization information could include, but is not limited to, time stamps, time slot identifiers, generation numbers, block numbers, sequence numbers, group names, group addresses, port numbers, etc. In one implementation, a time slot or generation number is used as the synchronization information in each packet, where every packet in the same generation has the same generation number and the generation numbers increase over time.

This synchronization information is one type of information that may be included in the metadata that may be within a data packet. Other types of information may also be included in the metadata, such as coefficients indicating the linear combination of the original set of data that is present in the packet, as described later.

Figure 6:
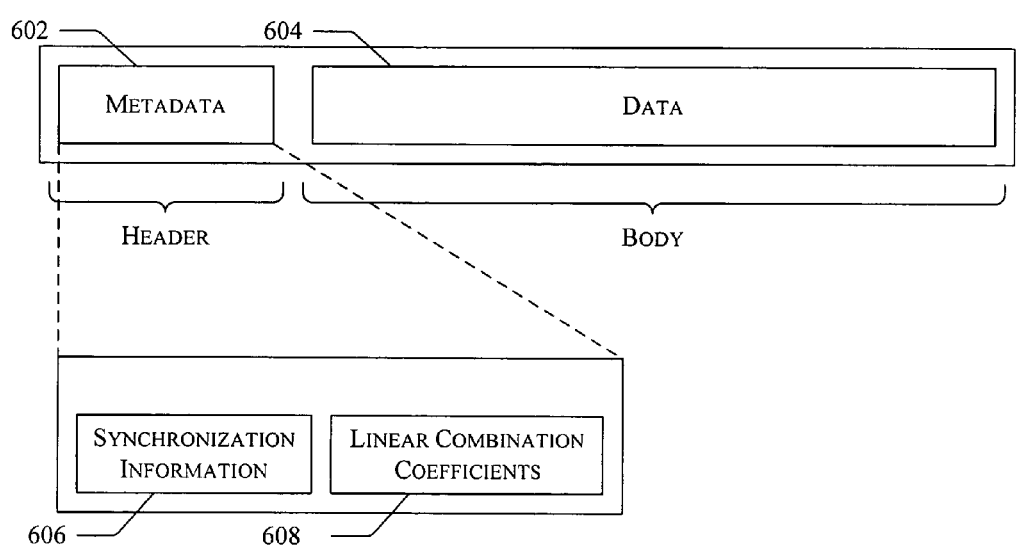
FIG. 6 illustrates a simple model of a data packet containing metadata and data.

FIG. 6 shows an exemplary data packet 600 containing the metadata 602 and data 604. In this implementation, the data 604 is that part of the packet 600 that is linearly combined with other data from another packet, the general process of which will be described below. The metadata 602 travels with the data 604 and may be used to identify the data 604. The metadata 602 may include various information, such as synchronization information 606 and linear combination coefficients 608, discussed below.

The data packet 600 of FIG. 6 is provided as an example to aid in discussion and is not intended to limit where in a data packet metadata and data are stored. In this example packet 600, the metadata 602 is stored in the header and data 604 is stored in the body. In practice, however, metadata and data may be stored in many different parts of and locations in a data packet, whether singly or in combination.

The metadata 602 contains, in this implementation, the synchronization information 606 indicating the synchronization between the data 604 and data of other packets created at block 502. The metadata 602 also contains, in this implementation, the coefficients 608 indicating the linear combination of an original set of data present in the data 604. This exemplary data packet 600 is used to aid in the description of the process 500.

The synchronization information 606 indicates the temporal relationships or other associations between the data 604 and data of other packets created at block 502, such as by each of the packets created at block 502 and each of the packets related to them having a same time slot or generation number. By so doing, a node may determine which packets related to the packets created at block 502 arrive late, out of order, or not at all. The synchronization information 606 may then be used by a node of the communication network 110 to reorder and resynchronize the packets arriving at the node.

The linear combination coefficients 608 represent a linear combination performed on an original set of data to obtain the data 604. Thus, they indicate the linear combination of the original set of data present in the data 604.

At block 506, the sender 102 sends the multiple data packets to nodes in the network 110.

At block 508, an internal node of the communication network 110 directly or indirectly receives the packets sent by the sender 102. The internal node may receive data packets directly from the sender 102 or from other, internal nodes that received the packets directly or indirectly from the sender 102. The internal node (such as the third node 206 of FIG. 4) receives the packets along edges from other nodes of the communication network 110 (including from the source node 102).

In one implementation, blocks 506 and 508 may be merged or eliminated if the sender 102 and an internal node are co-located. In this implementation, these blocks are not necessary because the packets do not need to be transmitted by the sender 102 in that case.

At block 510, the node synchronizes the received packets. This means that the node determines the temporal relationships or other associations between the received packets and the packets of original data. This may be done using the synchronization information included in the metadata in the packets. In the ongoing example, this metadata 602 may be read from the headers of the data packets, such as the header of the packet 600. There may be various types of synchronization information indicating temporal relationships or other associations between the received packets and the packets of original data. One type of synchronization information identifies each received packet as belonging to a certain group of packets established by the packets of original data. These groups may be organized by a generation number or by a block of time in which the packets of the original data were sent (such as a time slot). In this case, the synchronization information indicates a temporal relationship. Alternatively, such groups may be organized by a name (e.g., represented by a character string) such as the name or address of the intended recipients of the original data (e.g., a group of receivers) or a description of the original data or of its origin or of its intended use. In this case, the synchronization information does not indicate a temporal relationship but rather some other association between the received packets and the packets of original data. Another type of synchronization information that indicates a temporal relationship identifies each received packet as residing at a certain point within a moving interval of time or within a sliding window of packets. The interval or window may be specified by an initial time stamp or by a sequence number of a packet of original data, possibly followed by a duration or length. For example, such synchronization information could specify that a received packet contains information related to original packets beginning at sequence number $N_1$ and ending at sequence number $N_2$. Note, however, that the synchronization information discussed herein is different from ordinary packet sequence numbers. Whereas ordinary packet sequence numbers express a temporal relationship with other packets originating from the same location, the synchronization information discussed herein expresses a temporal relationship (or other association) between a packet and another set of packets not generally originating from the same location. Other types of synchronization information are also possible, as will be evident to those skilled in the art. The examples above are not intended to be exhaustive or exclusive.

The metadata 602, including synchronization information or ordinary sequence numbers, may also be used by the internal node to determine data packets that are missing. For example, after a node allows sufficient time to collect all the packets entering the node for a particular time slot, the outstanding packets in the time slot may be declared lost. This information may be used as part of block 512, discussed below.

At block 512, the node linearly combines the data in the synchronized incoming packets into data in an outgoing packet. The node may also linearly combine portions of the metadata in the incoming packets. In one implementation, the node linearly combines both the data within the packets (such as the data 604 of the packets 600) as well as linearly combines a portion of the metadata within the packets (such as the coefficients 608 of the packet 600).

Data flowing on the edges of a communication network (such as the communication network 110) may be represented mathematically as symbols from a finite field. Symbols may be a bit, a byte, a 16-bit word, or a 32-bit word. If a symbol is a 16-bit word, then a packet payload of about 1400 bytes may contain about 700 symbols. Of these 700 or so symbols in each packet transmitted along an edge, R symbols may be dedicated to a prefix vector. The remaining N symbols may be dedicated to the N-dimensional vector of code symbols that travel along the edge in a time slot. Thus, in addition to a header containing possible RTP/UDP/IP information as well as the synchronization information 606, each packet contains a body consisting of a vector of R+N symbols. R is chosen to be less than or equal to the capacity of the network, i.e., the minimum number of edges in any path between the source and a receiver. The transmission rate of R represents the number of packets transmitted by the source node in a time slot, as well as the maximum number of packets (after any losses) entering any receiver in a time slot. A reasonable number for R is 32.

Using symbols for purposes of discussion, after an internal node of the communication network 110 receives symbols for each of its incoming edges, it may produce a symbol for each of its outgoing edges by applying linear combinations to the symbols on its incoming edges, as shown in the figure below. Here, $e'_1$, $e'_2$, and $e'_3$ are incoming edges of a node, $e_1$ and $e_2$ are outgoing edges of the node, $Y(e'_1)$, $Y(e'_2)$, $Y(e'_3)$, $Y(e_1)$, and $Y(e_2)$ are symbols from a finite field along the edges, and the β's (which are symbol from the same finite field) are the coefficients of the linear combinations performed at the node, where $\beta_i(e_j)$ is the multiple of $Y(e'_i)$ that contributes to $Y(e_j)$. Arithmetic operation to linearly combine the data are carried out in the finite field.

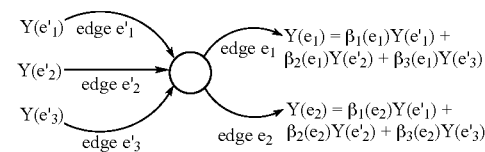

This may be repeated for each subsequent symbol, as illustrated in the following figure. Here, the subscripts 1, . . . , N of the Y's index the subsequent symbols.

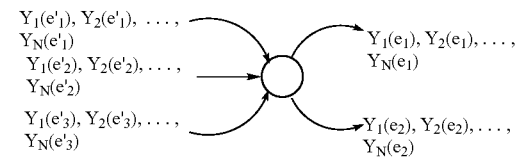

In one implementation of the process 500, the symbols on a network edge are grouped into time slots or generations of N symbols per time slot (such as using the synchronization information 606), and the symbols on an edge in each time slot are transmitted in a single, outgoing packet. Thus, each packet contains an N-dimensional vector of symbols for a given time slot, and in each time slot, each internal node produces a vector on each of its outgoing edges by applying a linear combination to the packets on its incoming edges, as illustrated in the following figure. (Here, the β's are again the linear combination coefficients in the chosen finite field, and the $\underline{Y}$'s are N-dimensional vectors of symbols in the finite field. Operations are carried out in the N-dimensional vector space over this field.)

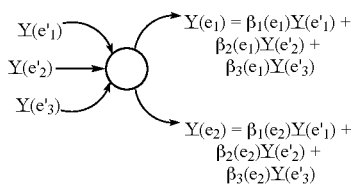

This may be repeated for subsequent packets, as illustrated in the following figure. The subscripts on the packets (i.e., on the vectors) identify the time slots sin which the packets are produced.

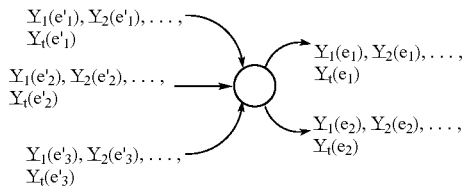

Thus, in each time slot the internal node produces an outgoing vector on each outgoing edge. The outgoing vectors constitute the data 604 in each outgoing packet 600. In this way, block 512 linearly combines the data in the synchronized packets into data in an outgoing packet.

Note that since the data vector in each outgoing packet is a linear combination of the data vectors in incoming packets, and the data vector in each incoming packet is a linear combination of the original set of data vectors issued by the sender, then by linearity the data vector in each outgoing packet is a linear combination of the original set of data vectors issued by the sender. Thus, if there are R vectors $X_1, \ldots, X_R$ in the original set of data, then each output vector Y(e) may be expressed as a linear combination $Y(e)=w_1X_1+\ldots+w_RX_R$ of the original set of data vectors, where $w_1, \ldots, w_R$ are the coefficients of the linear combination, and each coefficient is a symbol in the chosen finite field.

At block 514, the internal node records the linear combination performed at block 512. The internal node records the coefficients $w_1, \ldots, w_R$ representing the linear combination of the original set of data vectors that is present within the outgoing packet. In addition, the internal node records synchronization information (such as a timestamp or sequence/generation identifier) for the outgoing packet. In one implementation, the synchronization information 606 and the linear combination coefficients 608 are included in the metadata 602 in the outgoing packet 600. The outgoing packet may later be received by another internal node for combination with other packets received and synchronized, and so forth until the packets are received by the first or second receivers 104 and 106.

If a receiver knows the linear combination coefficients for each of R packets that it receives, that is, if it knows the linear combination coefficients $w_{i,1}, \ldots, w_{i,R}$ for the received packet containing data vector $Y(b_i)$, $i=1, \ldots, R$, then it may decode the R received data vectors $Y(e_1), \ldots, Y(e_R)$ to obtain the original data vectors $X_1, \ldots, X_R$ by inverting the matrix of coefficients $W_{R \times R}=[w_{ij}]$:

$$\begin{bmatrix} Y(e_1) \\ \vdots \\ Y(e_R) \end{bmatrix} = \begin{bmatrix} w_{1,1} & \cdots & w_{1,R} \\ \vdots & \ddots & \vdots \\ w_{R,1} & \cdots & w_{R,R} \end{bmatrix} \begin{bmatrix} X_1 \\ \vdots \\ X_R \end{bmatrix} = W_{R \times R} \begin{bmatrix} X_1 \\ \vdots \\ X_R \end{bmatrix}$$

For this reason, the record of linear combination coefficients (another type of metadata) may be sent, directly or indirectly, to the receiver.

As noted above, in one implementation, the synchronization information 606 and the linear combination coefficients 608 are included directly in the metadata 602 in each outgoing packet 600. This allows receivers to decode the data in the received packets into the originally sent data without any other knowledge of the network topology, the encoding functions performed at each interior node, the capacity of the network, or any link, node, or packet failure pattern. Thus, with the metadata recording the synchronization information and the linear operations performed, the receiver may synchronize and decode packets into data that was originally sent.

Since, in this implementation, the receiver does not need to know about the encoding functions at the internal nodes, the internal nodes may randomly encode (perform a random linear combination on) the synchronized packets. In some implementations, internal nodes may encode randomly as often as once every outgoing packet generated, independently of other nodes.

Also, internal nodes of the communication network 110 do not need to know the global network topology. With knowledge of local topology (i.e., upstream and downstream neighbors), rather than full global knowledge, internal nodes may linearly combine packets.

In this implantation, the information contained in the data packets is sufficient—no other information is required to be distributed to or from any internal node, either a priori at the time the internal node joins the network, or during operation, except possibly to establish and maintain knowledge of its neighbors. This greatly enhances network manageability, especially in ad hoc networks (where nodes come and go without any central authority), and greatly reduces communication costs. In particular, it provides a way to deal with packet losses while obviating the need for extra mechanisms or communications that may be problematic.

The discussion now returns to the previous example referencing data within packets as symbols.

Figure 7:
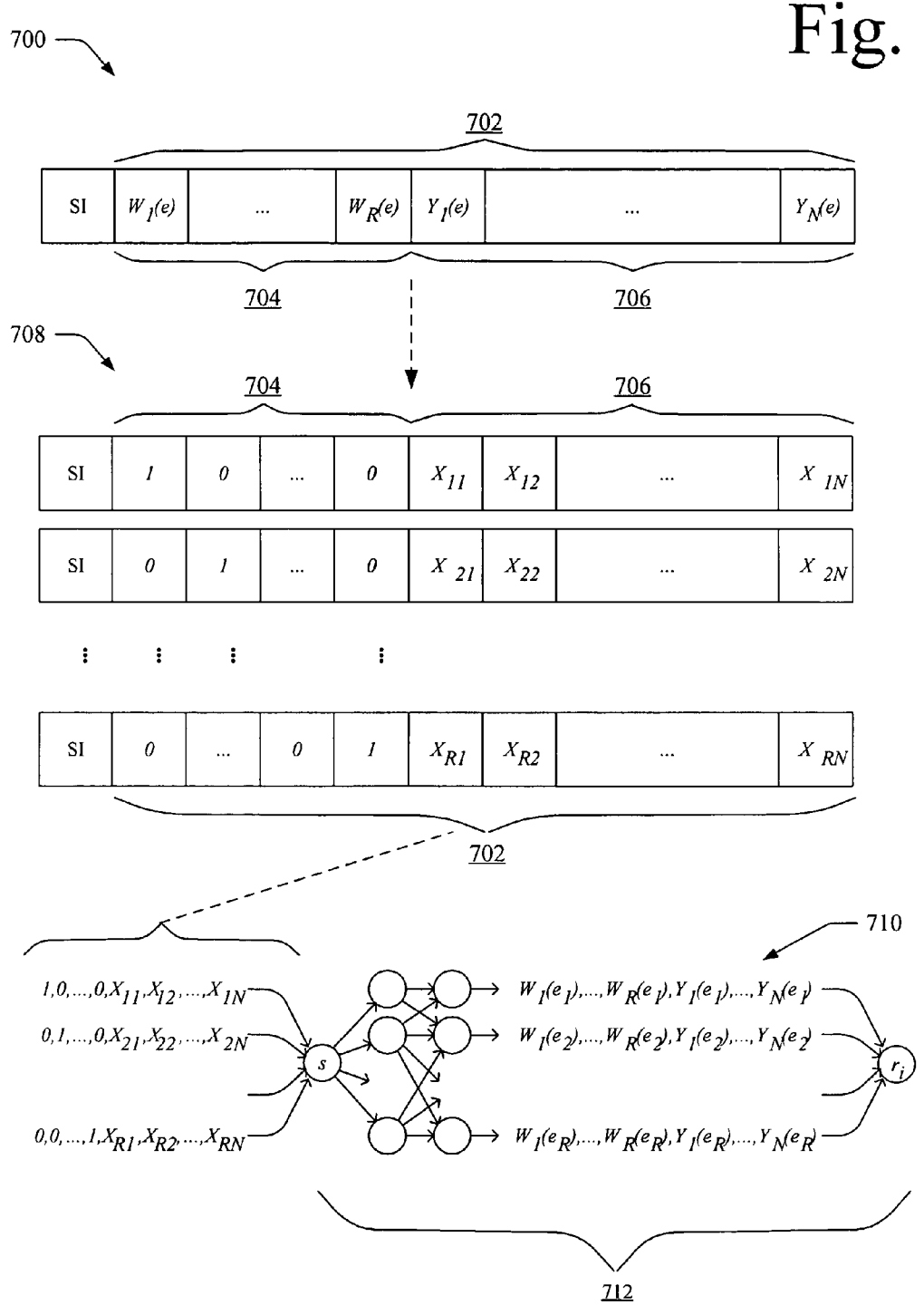
FIG. 7 illustrates models of synchronized data packets having a prefix and code symbols and showing a mathematical representation of resulting data packets after linear combinations are performed.

FIG. 7 depicts a packet 700 having synchronization information (SI) as well as an exemplary vector format with a vector 702 for a packet transmitted along an original network edge e. This vector 702 includes a prefix vector 704 and a data vector 7096 of symbols. The prefix vector 704 represents the coefficients of the linear combination of the original set of data vector present in the data vector 706. Thus, the synchronization information as well as the prefix vector are included in the metadata 602, while the data vector 706 is the data 604. This is therefore a case in which some metadata (namely the prefix vector 704) may be located in the packet body.

In this implementation, the internal nodes in the network 110 do not recognize the division of the vector 702 between the prefix vector 704 and data vector 706. So while the prefix vector 704 includes metadata about the data vector 706, the prefix vector 704 is not separate from the data vector 706. Thus, the internal nodes produce linear combinations of the vectors 702 in various packets as they would data above. Thus, the internal nodes (such as the third node 206) linearly combine all of the vectors 702 (which includes both data and metadata) in various packets. So the internal nodes also linearly combine some metadata (the prefix vector 704) about the data (the data vector 706).

At the source 102, however, the R source packets that are to be encoded and transmitted by the source 102 have their vector prefixes set equal to the R different R-dimensional unit vectors.

FIG. 7 also sets forth originally sent packets 708 that are examples of the packet 700 and the vector 702.

Linear combinations of the originally sent packets 708 are produced on the output edges of communication network 110 nodes; they are linear combinations of the originally sent packets 708 on the input edges of the nodes. Because of this, the packets that arrive on the input edges of each receiver are linear combinations of the R number of originally sent packets 708. FIG. 7 additionally sets forth linearly combined packets 710 and an example of part of the communication network 110 (referenced at 712). These combined packets 710 are linear combinations of the originally sent packets 708.

If a packet containing the vector $[W_1(e), \ldots, W_R(e), Y_1(e), \ldots, Y_N(e)]$ arrives on the input edge e of some receiver, then it is a linear combination of the R source packets, i.e., $$[W_1(e), \ldots, W_R(e), Y_1(e), \ldots, Y_N(e)] = [w_1 \; w_2 \; \ldots \; w_R] \begin{bmatrix} 1 & 0 & \ldots & 0 & X_{11} & X_{12} & \ldots & X_{1N} \\ 0 & 1 & \ldots & 0 & X_{21} & X_{22} & \ldots & X_{2N} \\ \vdots & \vdots & \ddots & \vdots & \vdots & \vdots & \ddots & \vdots \\ 0 & 0 & \ldots & 1 & X_{R1} & X_{R2} & \ldots & X_{RN} \end{bmatrix}$$

(Here $W_1(e), \ldots, W_R(e)$ are the first R coefficients of the vector 702 in the received packet (i.e., the prefix vector 704), $Y_1(e), \ldots, Y_N(e)$ are the last N coefficients of the vector 702 in the received packet (i.e., the data vector 706), $w_1, \ldots, w_R$ are the coefficients of the linear combination of the original set of data vectors present in the received packet, and $X_{i,1}, \ldots, X_{1,N}$ are the last N coefficients of the vector 702 in the $i^{th}$ original packet 708 (i.e., the $i^{th}$ original data vector 706). From this equation, the vector prefix 704 of the linearly combined packets 710, $[W_1(e), \ldots, W_R(e)]$, is shown to represent this linear combination, i.e., $[W_1(e), \ldots, W_R(e)] = [w_1, \ldots, w_R]$. Furthermore, collecting these vector prefixes 704 $[W_1(e), \ldots, W_R(e_i)]$ from each of the R packets, i=1, ..., R, and setting $$W_{R \times R} = \begin{bmatrix} W_1(e_1) & \ldots & W_R(e_1) \\ \vdots & \ddots & \vdots \\ W_1(e_R) & \ldots & W_R(e_R) \end{bmatrix}$$

then $$\begin{bmatrix} W_1(e_1), \ldots, W_R(e_1), Y_1(e_1), \ldots, Y_N(e_1) \\ W_1(e_2), \ldots, W_R(e_2), Y_1(e_2), \ldots, Y_N(e_2) \\ \vdots \\ W_1(e_R), \ldots, W_R(e_R), Y_1(e_R), \ldots, Y_N(e_R) \end{bmatrix} = W_{R \times R} \begin{bmatrix} 1 & 0 & \ldots & 0 & X_{11} & X_{12} & \ldots & X_{1N} \\ 0 & 1 & \ldots & 0 & X_{21} & X_{22} & \ldots & X_{2N} \\ \vdots & \vdots & \ddots & \vdots & \vdots & \vdots & \ddots & \vdots \\ 0 & 0 & \ldots & 1 & X_{R1} & X_{R2} & \ldots & X_{RN} \end{bmatrix}$$

Hence, if W is invertible, the original data shown in the originally sent packets 708 may be solved for using $$\begin{bmatrix} X_{11} & X_{12} & \ldots & X_{1N} \\ X_{21} & X_{22} & \ldots & X_{2N} \\ \vdots & \vdots & \ddots & \vdots \\ X_{R1} & X_{R2} & \ldots & X_{RN} \end{bmatrix} = W_{R \times R}^{-1} \begin{bmatrix} Y_1(e_1) & Y_2(e_1) & \ldots & Y_N(e_1) \\ Y_1(e_2) & Y_2(e_2) & \ldots & Y_N(e_2) \\ \vdots & \vdots & \ddots & \vdots \\ Y_1(e_R) & Y_2(e_R) & \ldots & Y_N(e_R) \end{bmatrix}.$$

If the encoding functions at each internal node are chosen randomly, then $W_{R \times R}$ will be invertible with high probability if the field size is sufficiently large. Indeed, $W_{R \times R}$ will be invertible at any given receiver with probability at least 1-δ if the field size is at least E/δ, where E is the number of edges in the graph and δ is any number greater than zero, and will be invertible at all receivers simultaneously with probability at least 1-δ if the field size is at least TE/δ, where T is the number of receivers. If T is $2^8$, E is $2^{16}$, and the field size is $2^{32}$, then the probability is at least $1-2^{16}$=0.999985 that the code will be invertible at any given receiver. Similarly, if T is $2^8$, E is $2^{16}$, and the field size is $2^{32}$, then with probability at least $1-2^8$=0.996, the code will be invertible at all receivers simultaneously.

Thus, by properly recording a linear combination performed at each internal node that linearly combines data packets, a receiving node may decode the data vectors 706 without knowing the encoding functions at the internal nodes or even the network topology. Indeed, the receiving node (such as the receivers 104 or 106) may decode the data vectors in the packets using the decoding matrices transmitted in the vector prefixes 704. By so doing, packet loss, patterns of link or node failure, and/or any rerouting or change to the network 110—that does not reduce the capacity below R—may be tolerated by a receiver without special notification.

At block 516, the internal node sends the outgoing packet. The outgoing packet, which is a linear combination of synchronized packets also received by the internal node, may next be received by the receiver 104 or 106 or another internal node. The possibility of receipt by another internal node is shown in FIG. 5 with a dashed line having an arrow from block 516 to block 508. Thus, if the next node to receive the outgoing packet is an internal node, the internal nodes treats the packet sent at block 516 as an incoming data packet. As set forth above, the internal node may then combine this incoming data packet with other, synchronized data packets and so forth.

At block 518, the receiver 104 or 106 receives the data packets, and at block 520, the receiver 104 or 106 synchronizes and decodes the data packets to determine originally sent data. The receiver 104 or 106 may perform this decoding as set forth above using the vector prefix 704, or the receiver 104 or 106 may also preform this decoding using similar information carried by the packets, though not necessarily in a prefix.

Also, the receiver 104 or 106 may decode the packets using information about how to decode the packets from a source other than the packets. This other source may determine how to decode the packets or provide information/metadata to aid the receiver 104 or 106 in decoding the packets. This information may include a general topology of the communication network 110 and/or the record of the operations performed at the internal nodes (from block 514).

Priority Encoding of Data

In some cases, the receivers 104 and 106 will not receive as many packets in a synchronized group as the number of packets sent from the sender 102. If, for instance, the sender 102 sends four packets, the first having data a, the second having data b, the third c, and the fourth d, and the first receiver 104 only receives three packets (containing, for example, the linear combinations (3a+213b+9c+24d), (4a+90b+230c+87d), and (a+12b+123c+4d)), the first receiver 106 cannot solve for a, b, c, and d. This failure to receive four packets could be from packet loss, component failure, and just a narrow pipe (hardware, like a low-band-width cable, than doesn't allow a lot of packets to get through in the amount of time needed). Thus the first receiver cannot recover any of the originally sent data. This is called a deciding failure.

Decoding failure due to erasure of one of the four packets may be guarded against by setting d to 0 (or to any other known linear combination of a, b, and c, possibly offset by a known constant) by common agreement between the sender and all the receivers. Then, three packets received by any receiver are sufficient for the receiver to recover a, b, and c. This is a form of error protection, in which redundant information (d) is sent to protect against possible erasures.

However, some receivers may receive one or two packets, while others may receiver all four. Hence it is desirable to have a scheme by which each receiver will be able to recover an amount of information commensurate with the number of packets it receives. This may be achieved by prioritizing the data and protecting the most importatn data with the most redundancy, the next most important data with the next most redundancy, and so forth.

By prioritizing the original data, the sender 102 may layer its information so that even for small numbers of packets received by a receiver, the highest priority information often gets through. The amount of information that gets through is commensurate with the number of packet received. This is especially well-suited to audio and video information, where codecs, for instance, may easily partition the signal information into layers of priority. The more packets received by the receiver, the higher the quality.

Thus, using this prioritizing, a receiver may tolerate packet loss; degradation due to increasing packet loss is gradual; the sender 102 needs to have only a vague idea of the communication network 110's capacity to determine its sending rate; the capacity to of the receivers 104 and 106 may be achieved individually (i.e., the amount of information received by the receivers 104 or 106 is not restricted to the broadcast capacity, which is the worst case capacity to an individual receiver); loss patterns that reduce the capacity of the network may be tolerated; and loss patterns that affect individual receivers need not affect all receivers.

In this implementation, the communication network 110 at blocks 502 and 520 of FIG. 5 prioritizes data within the data packets. It may prioritize data within packets by setting some of the original data in original packets to zero. In one implementation, the communication network 110 layers data by setting parts of data in a packet to zero, while filling parts of synchronized data in another packet with information.

Thus, in this implementation of blocks 502 and 520, the communication network 110 creates multiple packets of data, with some of the data within the multiple packets set to zero.

Figure 8:
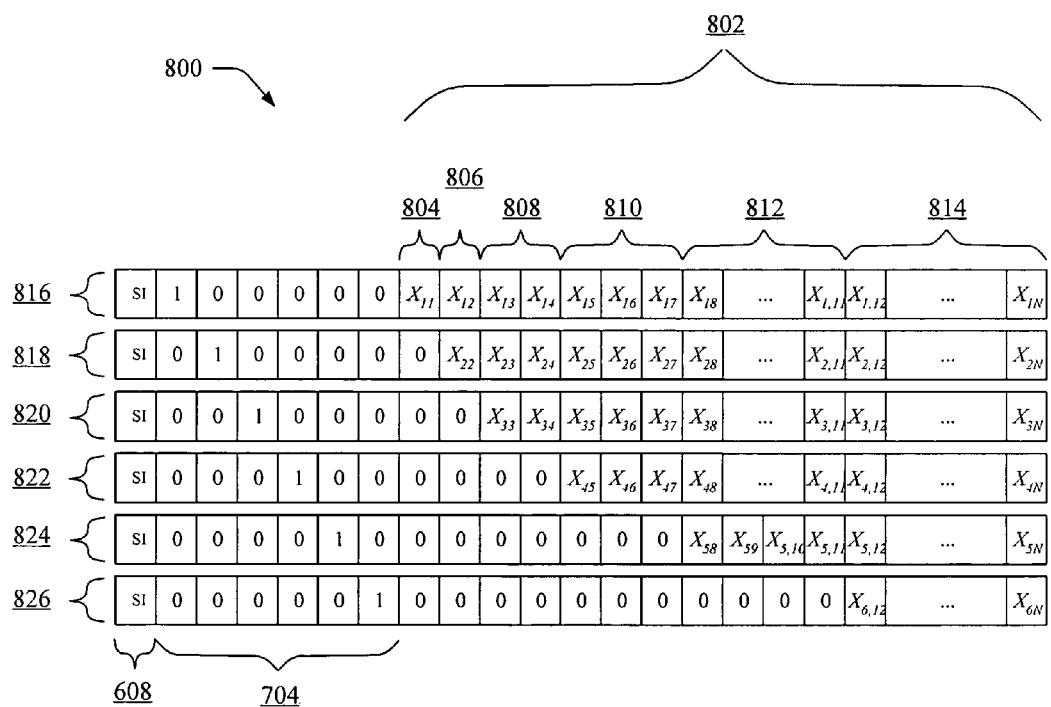
FIG. 8 illustrates models of synchronized data packets having layered data symbols.

FIG. 8 shows an exemplary set 800 of layered original data packets: a first packet 816; a second packet 818; a third packet 820; a fourth packet 822; other packets 824; and a final packet 826. The other packets 824 represent all those original data packets between the fourth packet 822 and the final packet 826. The data packets 816 through 826 each contain the synchronization information (SI) 606 of FIG. 6, the prefix vector 704 of FIG. 7, and a layered data vector 802 rather than the data vector 706 of FIG. 7. The layered data vector 802 and the prefix vector 704 are linearly combined with other data from other packets, the process of which is described in FIG. 5 above.

In this implementation, the layered symbols 802 include six layers of data: a first layer 804; a second layer 806; a third layer 808; a fourth layer 810; other layers 812; and a final layer 814. The other layers 812 represent all those layers between the fourth layer 810 and the final layer 814. It is clear that the first layer 804 contains the highest ratio of redundant information (zeros in this implementation) to real data, the second layer 806 contains the next highest ratio of redundant information to real data, and so forth. The last layer 814 contains no redundant information, and so the ratio of redundant information to real data is zero.

In this implementation, a receiver may partially decode data in packets (here the layered symbols 802) by decoding the high-priority information. A receiver may partially decode the layered symbols 802 if it receives fewer than R packets in a time slot.

The amount of information decoded is commensurate with the number of packets received. Different receivers may receive different numbers of packets, and decode correspondingly different amounts of information. Indeed, a receiver may decode the first k layers of importance if it receives at least k packets, as shown below. Decoding is therefore robust to packet loss, pattern of link or node failure, and rerouting or changes to the network, which may possibly reduce the capacity below R. Further, the sender 102 does not require a clear idea of the true capacity available to the receivers 104 or 106.

In this implementation of the prioritization, the sender 102 strategically inserts zeros into the transmitted source packets, as illustrated in FIG. 8. However, other known symbols or other known linear combinations of symbols in the other packets, possibly offset by a known constant, could be used.

As shown in FIG. 8, the source information to be transmitted is partitioned into R=6 data layers (some of which may be empty). Data layer k is placed after layers 1, . . . , k-1 in the packets, and the source originally sent) data in data layer k is striped across packets 1, . . . , k. Zeros are placed in the remaining R-k packets in data layer k.

These R packets are sent into the network as usual. If only $k \leq R$ packets are received by a receiver, then it collects the vector prefixes $[W_1(e_i), \ldots, W_R(e_i)]$ from each of the k packets, $i=1, \ldots, k$, and sets $$W_{k \times R} = \begin{bmatrix} W_1(e_1) & W_2(e_1) & \ldots & W_R(e_1) \\ \vdots & \vdots & \ddots & \vdots \\ W_1(e_k) & W_2(e_k) & \ldots & W_R(e_k) \end{bmatrix},$$

so that as usual, the received packets may be written as a linear combination of the source packets, $$\begin{bmatrix} W_1(e_1), \ldots, W_R(e_1), Y_1(e_1), \ldots, Y_N(e_1) \\ \vdots \\ W_1(e_k), \ldots, W_R(e_k), Y_1(e_k), \ldots, Y_N(e_k) \end{bmatrix} =$$

$$W_{k \times R} \begin{bmatrix} 1 & 0 & \ldots & 0 & X_{11} & X_{12} & \ldots & X_{1N} \\ 0 & 1 & \ldots & 0 & X_{21} & X_{22} & \ldots & X_{2N} \\ \vdots & \vdots & \ddots & \vdots & \vdots & \vdots & \ddots & \vdots \\ 0 & 0 & \ldots & 1 & X_{R1} & X_{R2} & \ldots & X_{RN} \end{bmatrix}$$

Here, however, the receiver has fewer received packets (row vectors in the matrix on the left) than source packets (row vector in the matrix on the right). But by the above construction, the last R-k packets in the matrix on the right are zero, for the components in data layers 1 through k. If the number of these components is N(k), the receiver 104 or 106 may truncate all the data vectors (the layered symbols 802) to N(k) components, and truncate all the prefix vectors 704 to k components Thus, $$W_{k \times k} = \begin{bmatrix} W_1(e_1) & \ldots & W_k(e_k) \\ \vdots & \ddots & \vdots \\ W_1(e_k) & \ldots & W_k(e_k) \end{bmatrix}$$

$$\begin{bmatrix} W_1(e_1), \ldots, W_k(e_1), Y_1(e_1), \ldots, Y_{N(k)}(e_1) \\ W_1(e_2), \ldots, W_k(e_2), Y_1(e_2), \ldots, Y_{N(k)}(e_2) \\ \vdots \\ W_1(e_k), \ldots, W_k(e_k), Y_1(e_k), \ldots, Y_{N(k)}(e_k) \end{bmatrix} =$$

$$W_{k \times k} \begin{bmatrix} 1 & 0 & \ldots & 0 & X_{11} & X_{12} & \ldots & X_{1N(k)} \\ 0 & 1 & \ldots & 0 & X_{21} & X_{22} & \ldots & X_{2N(k)} \\ \vdots & \vdots & \ddots & \vdots & \vdots & \vdots & \ddots & \vdots \\ 0 & 0 & \ldots & 1 & X_{k1} & X_{k2} & \ldots & X_{kN(k)} \end{bmatrix}$$

And, if $W_{k \times k}$ is invertible, the receiver 104 or 106 may solve for the source data components in the first k data layers using $$\begin{bmatrix} X_{11} & X_{12} & \ldots & X_{1N(k)} \\ X_{21} & X_{22} & \ldots & X_{2N(k)} \\ \vdots & \vdots & \ddots & \vdots \\ X_{k1} & X_{k2} & \ldots & X_{kN(k)} \end{bmatrix} = W_{k \times k}^{-1} \begin{bmatrix} Y_1(e_1) & Y_2(e_1) & \ldots & Y_{N(k)}(e_1) \\ Y_1(e_2) & Y_2(e_2) & \ldots & Y_{N(k)}(e_2) \\ \vdots & \vdots & \ddots & \vdots \\ Y_1(e_k) & Y_2(e_k) & \ldots & Y_{N(k)}(e_k) \end{bmatrix}.$$

The receiver 104 or 106 may perform the above calculations without the prefix 704 if the receiver knows $W_{k \times k}$.

One benefit of this prioritizing using zeros is that parity information (such as from an erasure code like a Reed-Solomon code) is not necessary. In this implementation, a separate erasure code is not necessary; this functionality is provided by linear combinations set forth above.

There are many published procedure for optimizing the partitioning of the source information into layers of priority of PET packetization. Publications include: Davis and Danskin, "Joint source and channel coding for image transmission over lossy packet networks," *SPIE Conf. on Wavelet Applications to Digital Image Processing*, Denver, August 1996; Mohr, Riskin, and Ladner, "Unequal loss protection: graceful degradation of image quality over packet erasure channels through forward error correction," *IEEE J. Selected Areas in Communication*, JSAC-18, pp. 819-829, June 2000; Puri and Ramchandran, "Multiple description source coding through forward error correction codes," *IEEE Conf. on Signals, Systems, and Computers*, Asilomar, October 1999; Stockhammer and Buchner, "Progressive texture video streaming for lossy packet networks," *Proc. 11th Int'l Packet Video Workshop*, Kyongju, May 2001; Stankovic, Hamzaoui, and Xiong, "Real-time near-optimal protection of embedded codes for packet erasure protection and fading channels," submitted; and Dumitrescu, Wu, and Wang, "Globally optimal uneven error-protected packetization of scalable code streams," *IEEE Trans. Multimedia*, to appear, June 2004. Any of these may also be used to optimize the partitioning of the source data into layers as described herein. These procedures typically optimize the layers to minimize the expected source distortion given the distortion-rate function D(R) of the source and the probability distribution p(k) of receiving k packets at a randomly chosen receiver.

Also, it is not necessary for a receiver to know, a priori, the boundaries N(k) between layer k-1 and k in the packets. These boundaries may be communicated as metadata, such as in part of the packet header. For a particular format of a packet header, see Leibl, Stockhammer, Wagner, Pandel, Baese, Nguyen, and Burkert, "An RTP payload format for erasure-resilient transmission of progressive multimedia streams," *IETF Internet Draft* draft-ietf-avt-uxp-00.txt, February 2001. For example, metadata could describe the number of symbols in each layer in the packet.

A Computer System

Figure 9:
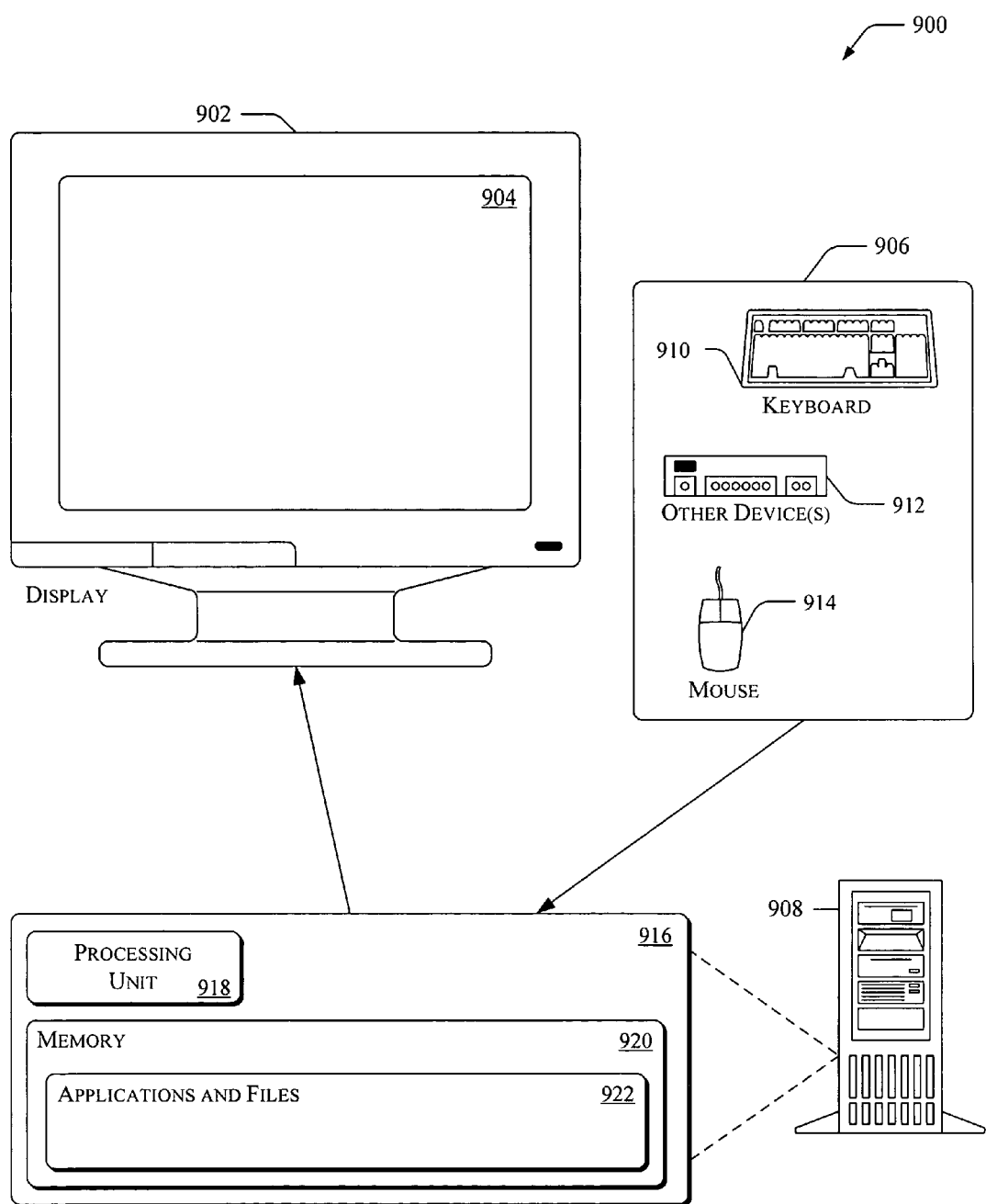
FIG. 9 is a block diagram of a computer system that is capable of acting as a sending, intermediate, or receiving node of a communication network that is capable of broadcasting data in packets using network coding.

FIG. 9 shows an exemplary computer system that may be used to implement the processes described herein. This exemplary computer system may perform the actions of a communication network (such as the communication network 110) and it parts, including a sending node (such as the sender 102), intermediate nodes (such as the nodes 202, 204, 206, and 208), and receiving nodes (such as the receivers 104 and 106).

The system 900 includes a display 902 having a screen 904, a user-input device 906, and a computer 908. The user-input device 906 may include any device allowing a computer to receive input from a user, such as a keyboard 910, other devices 912, and a mouse 914. The other devices 912 may include a touch screen, a voice-activated input device, a track ball, and the like.

The computer 908 includes components shown in block 916, such as a processing unit 918 to execute applications and a memory 920 containing various applications and files 922. The memory 920 includes computer-readable media. The computer-readable media may be any available media that may be accessed by the computer 908. Computer-readable media is defined by computer storage media comprising volatile and nonvolatile, removable and non-removable media implemented in any method or technology for storage of information such as computer-readable instructions, data structures, program modules, and other media. Computer storage media includes, but is not limited to, RAM, ROM, EEPROM, flash memory, or other memory technology, CD-ROM, digital versatile disks (DVD), or other optical storage, magnetic cassettes, magnetic tape, magnetic disk storage, or other magnetic storage devices. Communication media typically embodies computer-readable instructions, data structures and program modules. By way of example, and not limitation, communication media includes wired media such as a wired network or direct-wired connection, and wireless media, such as acoustic, RF, infrared, or other wireless media.

CONCLUSION

The above-described system and method enables increased throughput and reliability of data broadcast across a network. It also enables a network to broadcast information in packets without full knowledge of the network's topology. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. One or more computer-readable media encoded with computer-executable instructions that perform the following when executed by a computer:
receiving incoming packets of data and metadata, wherein the metadata comprises a synchronization information and a linear combination coefficients;
synchronizing the incoming packets; and
linearly combining the data and the linear combination coefficients part of the metadata of each of synchronized incoming packets into a new data portion of an outgoing packet, and inserting in a new metadata portion that is part of the outgoing packet, new linear combination coefficients that identify the data and the linear combination coefficients of the metadata within the synchronized incoming packets.

2. The computer-readable media of claim 1, further comprising:
sending the outgoing packet.

3. The computer-readable media of claim 1, further comprising including synchronization information in the metadata of the outgoing packet.

4. The computer-readable media of claim 1, wherein the synchronizing includes reading the synchronization information from the metadata, the synchronization information including a sequence number.

5. The computer-readable media of claim 1, wherein the synchronizing includes reading the synchronization information from the metadata, the synchronization information including time slots, wherein the incoming packets having matching time slots are deemed synchronized.

6. The computer-readable media of claim 1, wherein the synchronizing includes reading the synchronization information from the metadata.

7. The computer-readable media of claim 1, further comprising:
receiving the outgoing packet and other outgoing packets;
synchronizing the outgoing packet and the other outgoing packets;
linearly combining the new data portion of the outgoing packets into a second generation outgoing packet;
inserting in a second generation metadata portion that is part of the second generation outgoing packet, linear combination coefficients that identify each new data portion of synchronized outgoing packets; and
sending the second generation outgoing packet of data.

8. The computer-readable media of claim 1, wherein the data of each of the incoming packets includes one or more parts, or a linear combination of one or more parts, of a set of data and further comprising recording, within the outgoing packet, a complete linear combination of the set of data that is present within the outgoing packet.

9. The computer-readable media of claim 1, wherein the data of each of the incoming packets includes one or more vectors, or a linear combination of one or more vectors, of a set of data vectors and further comprising recording, within the outgoing packet, coefficients representing all linear combinations of the set of data vectors present within the data of the outgoing packet.

10. The computer-readable media of claim 1, wherein the data of each of the incoming packets includes one or more vectors, or a linear combination of one or more vectors, of a set of data vectors and further comprising recording, within the outgoing packet, information sufficient to disassemble the data in the outgoing packet into the set of data vectors if all but one of each of the vectors in the set of data vectors is known.

11. The computer-readable media of claim 10, wherein the recording is made into a header of the outgoing packet.

12. A system comprising:
a node of a communication network, wherein the node is capable of:
linearly combining data from multiple incoming packets of data into an outgoing packet of data, the data from each of the multiple incoming packets being a linear combination of an original set of data vectors and each of the multiple incoming packets including incoming metadata indicating the linear combination of the original set of data vectors present in each of the multiple incoming packets, wherein the metadata comprises a synchronization information and a linear combination coefficient; and
recording into the outgoing packet, based on the linear combination performed on the data and the linear combination coefficient of the metadata from the multiple incoming packets, outgoing metadata indicating the linear combination of the original set of data vectors and the linear combination coefficient of the metadata present in the outgoing packet.

13. The system of claim 12, wherein the node is further capable of:
receiving the incoming packets of data; and
sending the outgoing packet of data.

14. The system of claim 12, wherein the node includes a computer server.

15. The system of claim 12, wherein the node includes a computer.

16. The system of claim 12, wherein the node includes a router.

17. One or more computer-readable media encoded with computer-executable instructions that perform the following when executed by a computer:

receiving incoming packets of data and metadata, the data of each incoming packet being a linear combination of an original set of data vectors, the data vectors in the original set of data vectors being identically partitioned into a first number of layers of data, wherein at least one of the data vectors contains a layer of data that is set to elements computable from the other data vectors;

determining, based on the metadata in each of the incoming packets, the linear combination of the original set of data vectors that is present within each of the incoming packets; and inverting the data in each of the incoming packets to obtain a second number of layers of data of the original set of data vectors, wherein the second number is less than the first number.

18. The computer-readable media of claim 17, wherein the elements computable from the other data vectors are zero.

19. The computer-readable media of claim 17, wherein the metadata of each incoming packet indicates the linear combination of the original set of data vectors that is present within the incoming packet.

20. An apparatus comprising:

means for receiving incoming packets of information, each of the incoming packets having incoming data and incoming metadata, each of the incoming data being a linear combination of an original set of data vectors and each of the incoming metadata indicating the linear combination present in each of the incoming data, wherein the incoming metadata comprises a synchronization information and a linear combination coefficients;

means for linearly combining the incoming data and the linear combination coefficients of the incoming metadata of the incoming packets of information into an outgoing packet of information; and means for recording outgoing metadata within the outgoing packet, the outgoing metadata indicating a linear combination of the original set of data vectors present in the outgoing packet.

21. The apparatus of claim 20, further comprising:

means for disassembling, with aid from the outgoing metadata, the linear combination within the outgoing packet into the original set of data vectors.

* * * * *